United States Patent [19]

Yarnell

[11] Patent Number: 4,789,268

[45] Date of Patent: Dec. 6, 1988

[54] DEVICE AND METHOD FOR REMOVING IRREGULARITIES IN OR ENLARGING AN UNDERGROUND DUCT

[75] Inventor: Ian R. Yarnell, Haslemere, England

[73] Assignee: Internal Pipe Drillings Limited, Midhurst, England

[21] Appl. No.: 22,708

[22] Filed: Mar. 6, 1987

Related U.S. Application Data

[63] Continuation of Ser. No. 679,671, Dec. 10, 1984, Pat. No. 4,657,436, which is a continuation-in-part of Ser. No. 504,603, Jun. 15, 1983, Pat. No. 4,487,052.

[30] Foreign Application Priority Data

Jun. 18, 1981 [GB] United Kingdom ................ 8217645
Dec. 16, 1983 [GB] United Kingdom ................ 8333567

[51] Int. Cl.$^4$ ............................................. F16L 1/00
[52] U.S. Cl. .................................. 405/154; 405/184; 30/92.5; 166/55.3; 166/361
[58] Field of Search ....................... 405/154, 184, 156; 175/53; 166/55, 55.3, 361; 138/97; 254/134.3 FT; 30/92.5

[56] References Cited

U.S. PATENT DOCUMENTS

| 3,181,302 | 5/1965 | Lindsay | 405/156 |
| 3,602,263 | 8/1971 | Bremner | 405/154 X |
| 4,106,561 | 8/1978 | Jerome et al. | 166/55.3 X |
| 4,309,128 | 1/1982 | Williams | 405/154 |
| 4,457,647 | 7/1984 | Dusette et al. | 405/154 |
| 4,487,052 | 12/1984 | Yarnell | 254/134.3 FT |
| 4,505,302 | 3/1985 | Streatfield et al. | 138/97 |
| 4,602,495 | 7/1986 | Yarnell | 72/393 |
| 4,657,436 | 4/1987 | Yarnell | 405/154 |

FOREIGN PATENT DOCUMENTS

| 1067190 | 1/1984 | U.S.S.R. | 175/53 |
| 2092701 | 8/1982 | United Kingdom | 405/154 |

Primary Examiner—Dennis L. Taylor
Attorney, Agent, or Firm—Hale and Dorr

[57] ABSTRACT

A device for removing irregularities in or enlarging a buried duct comprises a cylindrical housing corresponding approximately in diameter to the required diameter of the duct, an expandable shell comprising a plurality of tapered leaf members pivotally attached at their rear ends to the front of the housing, and remotely controllable drive means for moving the leaf members between contracted and expanded configurations. In operation, the apparatus is drawn through the duct with the leaf members in a contracted configuration in which they enter a portion of the duct of a diameter less than the required diameter. The drive means is operated to force the leaf members outwardly against the sides of the duct to expand the duct. The leaf members are then retracted and the apparatus is drawn forward. The apparatus is particularly intended for preparing damaged sewers prior to fitting an inner, lining pipe.

24 Claims, 6 Drawing Sheets

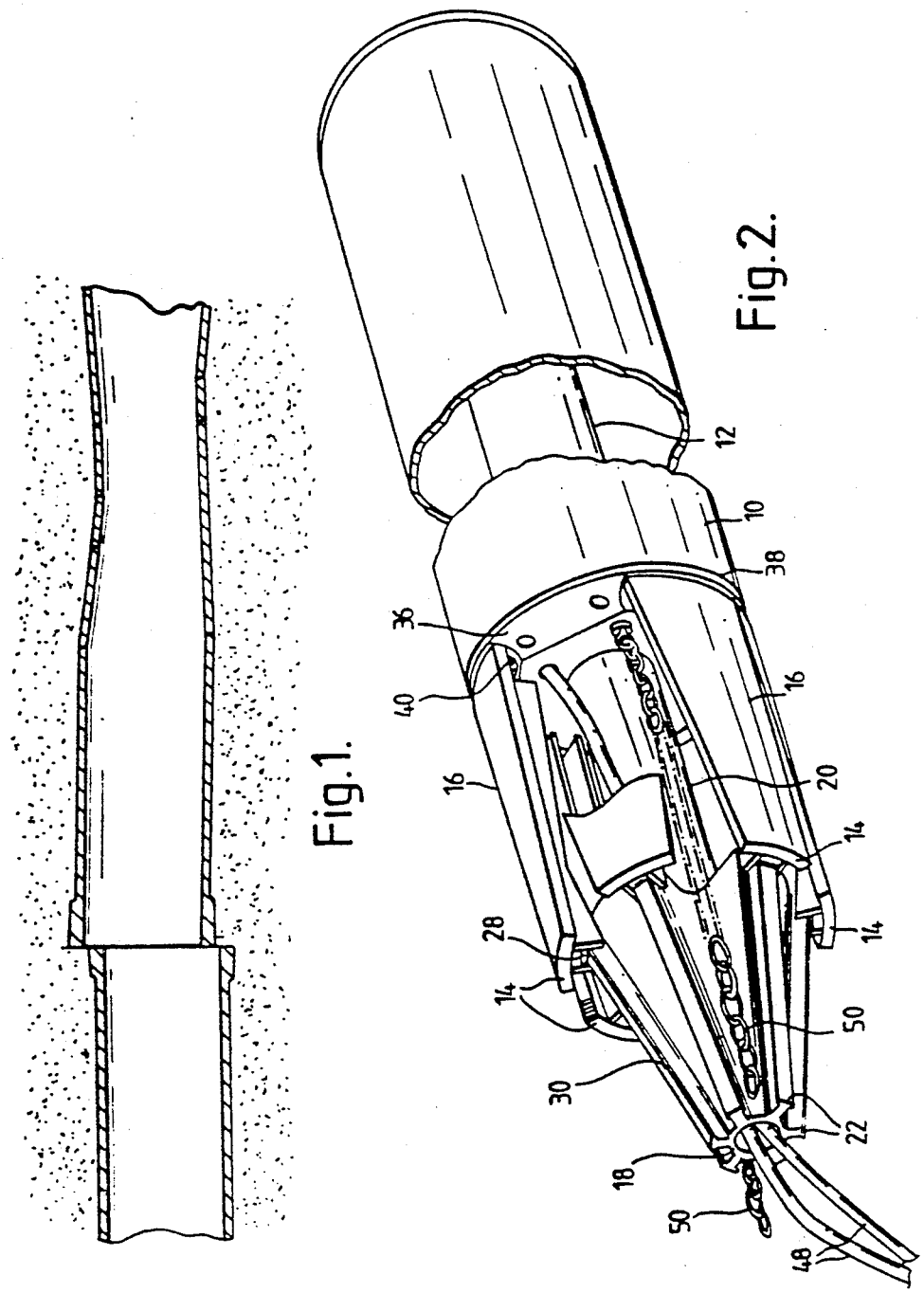

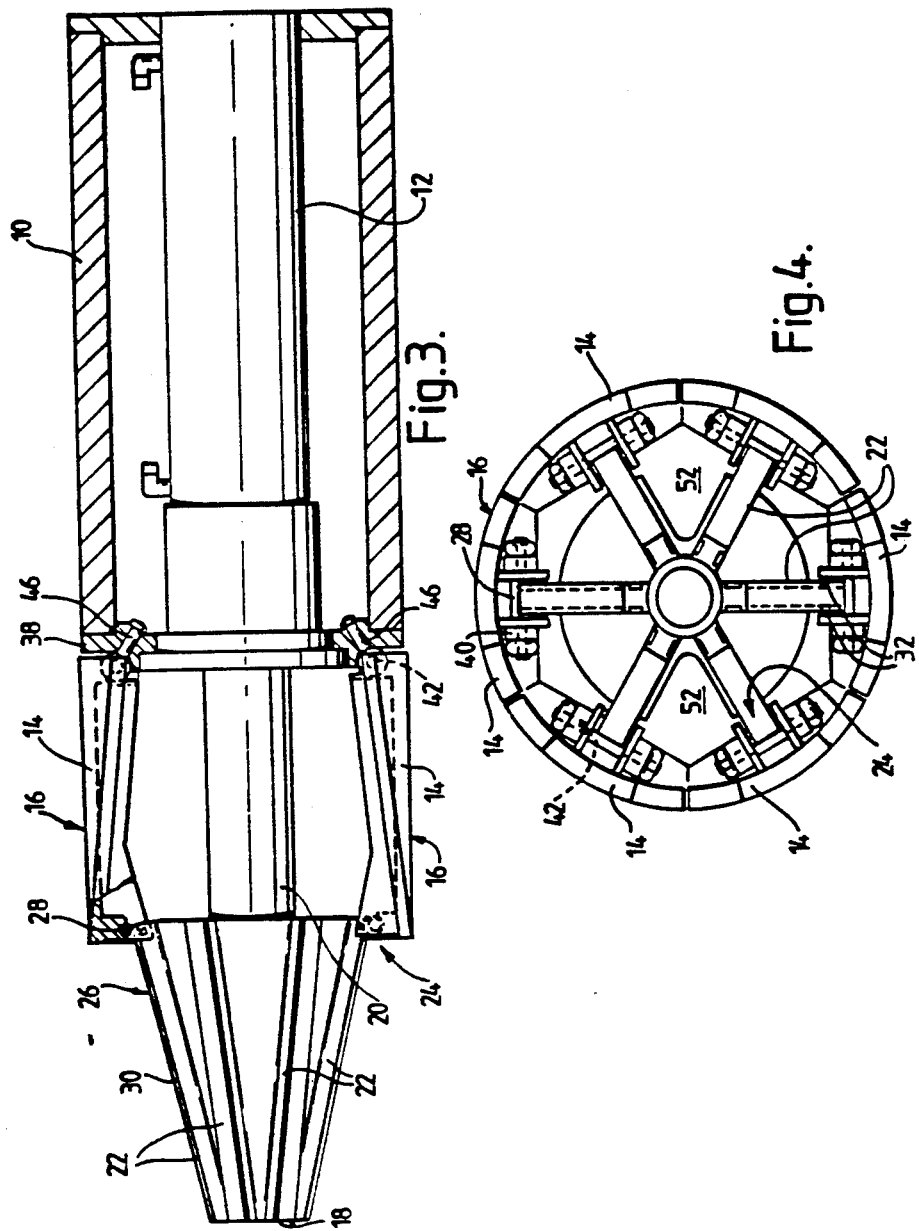

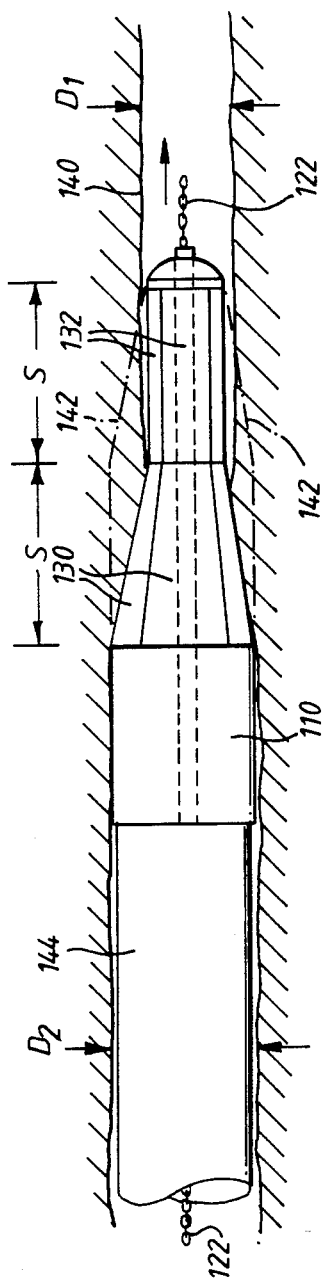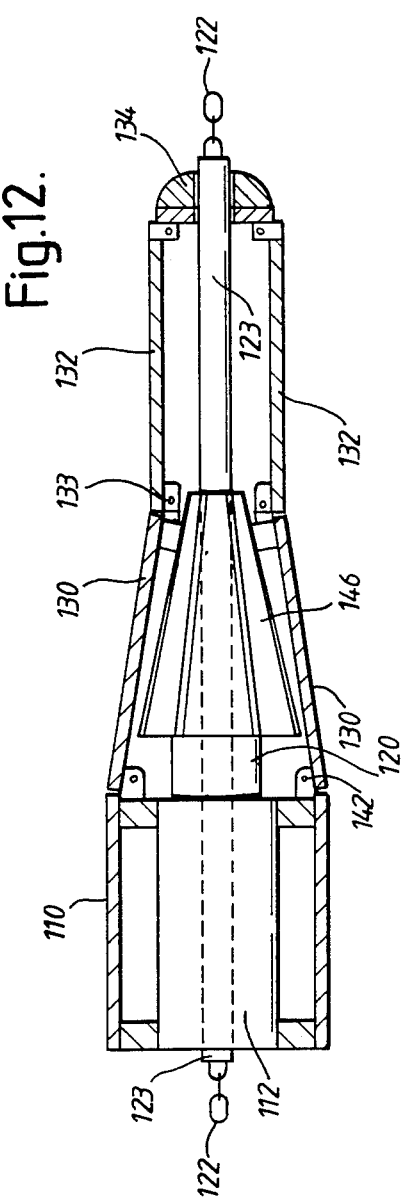

DEVICE AND METHOD FOR REMOVING IRREGULARITIES IN OR ENLARGING AN UNDERGROUND DUCT

This application is a continuation of U.S. patent application Ser. No. 679,671, filed Dec. 10, 1984, now U.S. Pat. No. 4,657,436, which is a continuation-in-part of U.S. patent application Ser. No. 504,603, filed June 15, 1983 (now U.S. Pat. No. 4,487,052).

This invention relates to a device for profiling an underground duct, for example an underground sewer which is to be repaired by fitting an inner pipe lining.

In many of the developed industrial countries of the world, underground sewers have to a large extent reached an age at which they are in a state of severe disrepair and liable to collapse. One method of repairing sewers is to line the existing sewer pipe internally with plastics pipe sections or an expandable plastics sleeve. However, the condition of the original sewer is often such that the original earthenware pipe sections are displaced relative to each other or have already partly collasped. In these circumstances the diameter of an inner pipe lining made up of rigid plastics pipe sections is limited over the length of sewer being repaired to that determined by the worst irregularity in that length. The result is that the flow capacity of the repaired sewer may be considerably reduced. Attempts have been made to hammer out the irregularities with a remotely controlled machine, but this has proved difficult to control and can worsen the state of collapse.

It is an object of this invention to provide apparatus able largely to enlarge or correct the irregularities in an existing sewer in a relatively controllable and reliable manner.

SUMMARY OF THE INVENTION

According to a first aspect of this invention, apparatus for travelling through an underground duct and for removing irregularities in or enlarging the duct comprises an expandable segmented shell including a series of shell parts arranged around a longitudinal axis of the apparatus and having respective outwardly facing surface portions for engaging the sides of the duct, and a trailing portion extending rearwardly of the expandable shell in a longitudinal direction and having a diameter equal to or approaching a required duct diameter, wherein the shell parts are drivable laterally with respect to the axis from a contracted configuration in which at least front end portions of the shell parts lie within a duct penetration diameter, to an expanded configuration for driving the sides of the duct away from the axis to create a space within the duct of a diameter sufficient to receive the said trailing portion when the apparatus travels forward in the duct.

In a preferred embodiment of the invention, the apparatus of the subject invention the trailing portion has a generally cylindrical outer surface corresponding substantially to the required diameter of the duct, and housing a longitudinally mounted ram or rams and means attaching the ram to the shell parts so that operation of the ram causes the leaf members to move outwardly or inwardly.

In another preferred embodiment, the attaching means comprises a plurality of connecting links having their opposite ends pivotally coupled respectively to the shell parts and to driving means producing longitudinal motion. In a particularly preferred embodiment, one connecting link is provided for each shell part and is coupled at one end to a distal end of the shell part and at the other end to the piston of a hydraulic ram, the outward stroke of the ram putting the link under compression and thereby forcing the distal end of the shell part away from the longitudinal axis, with the shell part pivoting about its proximal end and where it is attached to the body member.

The trailing portion may include a lining pipe coupled behind the shell.

The ram referred to above may be hollow in the sense that it has an annular cylinder with concentric tubular inner and outer walls, and an annular piston sliding in the space between the walls. This allows the device to be provided with a central longitudinal passage for a chain or cable extending from a winch ahead of the apparatus, through the apparatus, and to the rear end of a lining pipe behind the apparatus, allowing the pipe, which may be in sections, to be drawn forward in the duct under compression.

According to a second aspect of the invention, apparatus for travelling through an underground duct and for enlarging or removing irregularities in the duct comprises an expandable segmented shell including a series of shell parts arranged around a longitudinal axis of the apparatus and having respective outwardly facing surface portions for engaging the sides of the duct, wherein the shell parts are movable laterally with respect to the axis from a contracted configuration to an expanded configuration for forcing the sides of the duct away from the axis to enlarge a portion of the duct, and a nose portion extending in a longitudinal direction forwardly of the segmented shell portion and having an outer surface engaging the sides of the duct ahead of the said segmented shell portion. The nose portion may comprise a second expandable and segmented shell including a second series of shell parts arranged around a longitudinal axis and having respective second outwardly facing surface portions for engaging the sides of the duct, the shell part of the second series being movable transversely with respect to the said axis between a contracted configuration and an expanded configuration. The shell parts of both series preferably each have a front end and a rear end, the front ends of the shell parts of the second series are each coupled on a first diameter around a forward pivot assembly by a plurality of respective forward pivot joints, the rear ends of the shell parts of the second series are each coupled by respective intermediate pivot joints to the front ends of the shell parts of the first series, and the rear ends of the shell parts of the first series to a base member on a second diameter which is larger than the first diameter. In this case internally mounted fluid drive means are preferably coupled to the shell parts in the region of the intermediate joints, having a generally cylindrical outer surface when in the contracted configuration, thereby defining the penetration diameter, and a forwardly tapering outer surface in a fully expanded configuration. This tapering outer surface advantageously corresponds substantially in shape to the forwardly tapering outer surface of the first series of shell parts when in their contracted configuration, such that the portion of the duct expanded by the nose portion is shaped to receive the whole length of the first series of shell parts, whilst a trailing part of the apparatus, which may or may not include the pipe lining behind it, simultaneously moves into a substantially cylindrical duct portion created by the expansion of the first series of shell parts.

According to a third aspect of the invention, there is provided apparatus for travelling through an underground duct and for enlarging or removing irregularities in the duct, wherein the apparatus comprises an expandable segmented shell including a plurality of shell parts arranged around a longitudinal axis of the apparatus and having respective outwardly facing surface portions for engaging the sides of the duct, and wherein the shell parts are drivable laterally with respect to the axis from a contracted configuration, in which at least a front end portion of the shell lies within a duct penetration diameter, to an expanded configuration in which the shell defines a forwardly tapered outer surface portion. Such tapering may be produced by a shell having two shell portions each having a respective series of transversely movable shell parts.

Method aspects of the invention include a method of removing irregularities in or enlarging an underground duct comprising the steps of (i) locating in the duct apparatus having a front part including an expandable shell portion comprising a plurality of shell parts arranged around a longitudinal axis and movable laterally with respect to the axis between a contracted configuration in which at least a front end section of the expandable shell portion lies within a duct penetration diameter and an expanded configuration defining a larger, required duct diameter, and a rear part having a diameter greater than the penetration diameter and less than or equal to the required duct diameter, the apparatus being located in the duct with the shell parts in their contracted configuration and penetrating a portion of the duct of less than the required diameter, (ii) driving the shell parts outwardly into their expanded configuration thereby forcing the sides of the duct away from the axis to create an enlarged duct portion having a diameter at least as great as the said required duct diameter, (iii) causing the shell parts to return to their contracted configuration and the apparatus to move forwardly in the duct whereby the shell parts penetrate a new portion of the duct of less than the required diameter, and (iv) repeating steps (ii) and (iii) to traverse a required duct length. A lining pipe may be simultaneously fed into the enlarged duct as part of or as an addition to the apparatus referred to above, the pipe being towed from the front or pushed from behind.

According to a second method aspect, the invention includes (i) locating in the duct on expansion device including a leading expandable shell portion and a trailing expandable shell portion, which portions comprise respectively leading and trailing sets of shell parts which are movable laterally with respect to a longitudinal axis between a contracted configuration and an expanded configuration, the device being located in the duct with the shell parts in their contracted configuration and the leading shell portion in an unexpanded duct portion, (ii) driving the shell parts into their expanded configuration to force the sides of the duct away from the axis to create an enlarged duct portion having a front section which is forwardly tapering and a rear section having an overall diameter at least as large as the required diameter of the duct, (iii) causing the shell parts to return to their contracted configuration and the device to move forwardly by a distance such that leading shell portion enters a new unexpanded duct portion, and the trailing shell portion substantially occupies the said front section of the enlarged duct portion, and (iv) repeating steps (ii) and (iii) to traverse a required duct length.

In a preferred method, the apparatus or the expansion device are subjected to a continuous forwardly directed force and the shell parts are reciprocated back and forth in a regular manner. In this way, the apparatus or device moves forward automatically on each contraction stroke. Providing a nose portion corresponding, at least in the contracted configuration, substantially to the penetration diameter largely prevents the inward collapse of the sides of the duct prior to moving forward the apparatus or device.

The apparatus or device may be driven through the duct by repeatedly operating a hydraulic ram at an accessible location, the ram being alternately connected and disconnected during each operating stroke to a chain or wire connected to the device through the duct.

BRIEF DESCRIPTION OF THE DRAWINGS

The invention will now be described by way of example with reference to FIGS. 1 to 12 of the drawings in which:

FIG. 1 is a schematic view of two sections of an underground pipe which have become displaced relative to each other;

FIG. 2 is a perspective view of an embodiment of the device of the present invention with shell parts in an expanded configuration;

FIG. 3 is a cut away side elevation of the device of FIG. 2 with a ram housing shown in section, and with shell parts again in their expanded configuration;

FIG. 4 is an end elevation of the device of FIGS. 2-3.

FIG. 11 shows an operative environment of the device shown in FIGS. 9-10 in an underground duct; and FIG. 12 shows an alternative expansion means for expanding the shell parts shown in FIGS. 9-11.

Referring now to FIGS. 2-5 of the drawings, one embodiment of the present invention comprises a cylindrical base member 10 which acts as a housing for a longitudinally mounted double-acting ram 12. The diameter of the base member 10 corresponds approximately to the required internal diameter of the duct so that the device can be positioned in the duct with its longitudinal axis substantially coincident with the axis of the duct. Attached to to the front end of the base member 10 are six tapered shell parts in the form of leaf members 14 arranged in annular fashion symmetrically around the longitudinal axis. Each leaf member 14 has a part conical outer surface 16 and is pivotally mounted at its rear, proximal end to the base member 14 so that it is pivotable about a respective transverse axis. The transverse axes together form a regular polygon perpendicular to the longitudinal axis, in this case a hexagon. A generally conical expander wedge 18 is mounted on the piston rod 20 of the ram 12 for moving the leaf members 14 between a first, contracted configuration position (FIG. 5) in which the leaf members 14 form a conical shell, and a second, expanded configuration in which their outer surfaces 16 constitute a generally cylindrical shell forming a continuation of the outer surface of the base member.

Figure 5:
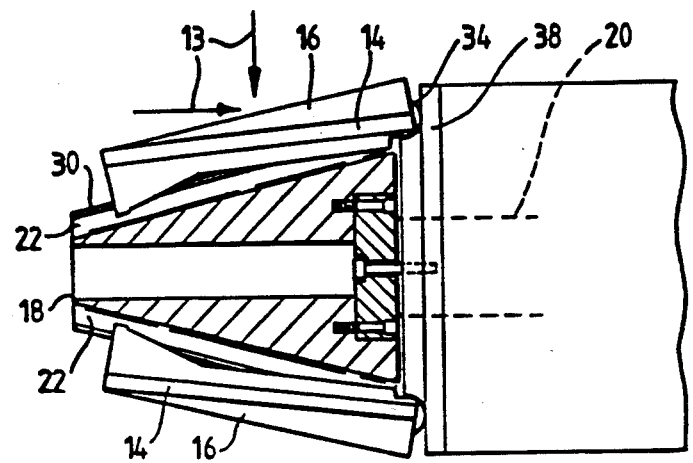
FIG. 5 is a side elevation of part of the device of FIGS. 2-4, showing the shell parts in their contracted configuration.

Guide rails 22 on the wedge 18 locate in channels 24 formed in the undersides of the leaf members 14, and the outer surfaces 26 of the rails are engaged by rollers 28 trapped in recesses at the front ends of the leaf members 14. Each rail 22 has a flange 30 so that a pair of studs 32 (FIG. 4) fixed in each leaf member 14 and located under the flange retains the front end of the leaf member on the rail 22. It will be appreciated that when the leaf members 14 are under load, as is the case when the device is being drawn through the undersize or collapsed duct, or when the ram 12 is operated to force the duct wall outward, considerable inwardly and rearwardly directed forces 13 are exerted on the leaf members 14, and in turn on the base member 10 through the pivoted connections at the rear ends of the leaf members 14. These forces are transmitted between a transverse, convex, part-cylindrical bearing surface 34 (Figure 5) on the rear end of each leaf member 14, and a concave part-cylindrical bearing surface 36 (FIG. 2) of corresponding radius machined in an annular end portion 38 of the base member 10.

The end portion 38 has six such bearing surfaces 36 arranged in a hexagon around its perimeter. The leaf member bearing surface 36 is provided by a transverse steel bar 40 (FIGS. 2 and 4) welded to the rear end of the respective leaf member. For each leaf member 14 two pins 42 (FIG. 2 and FIG. 3) received in a bolt bored through the bar 40, locate in the eyes of two inclined bolts 46 (FIG. 3) secured in the end position 38 of the base member 10. The pins 42 serve only to retain the leaf member on the base member 10; they are a loose fit in the bolt eyes, the compression forces under load being transmitted through the bearing surfaces referred to above.

Figure 6:
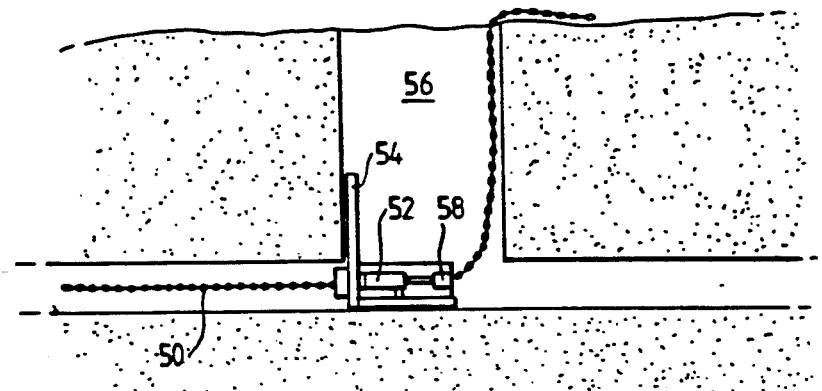
FIG. 6 is a diagrammatic section showing means for applying a pulling force to a chain at one end of an underground duct.

Hydraulic supply pipes 48 for the ram 12 pass through the end portion 38 of the base member 10 and through the interior of the wedge 18. Chains 50 for drawing the device through the duct are attached to the base member 10 and pass through a pair of recesses 52 (FIG. 4) in the outer surface of the wedge 18, although in an alternative embodiment (not shown) the chains may be attached instead to the front end of the wedge 18. Referring to FIG. 6, the chains 50 are fed along the duct to a drive ram 52 mounted in a stationary frame 54 bearing against the side of, for example, a manhole 56. To pull the apparatus through the duct, the ram 52 is reciprocated back and forth repeatedly, the piston rod of the ram 52 being alternately connected and disconnected with the chain 50. A ratchet device 58 holds the chain 50 in tension between each stroke of the ram 52. A pair of rams may be used in place of the single ram 52.

In operation the remotely controllable device shown in FIGS. 2-5 and the drive mechanism shown in FIG. 6 act together as follows.

The remotely controllable device is positioned in the duct at the beginning of the stretch to be traversed and chains 50 are passed through the duct together with the hydraulic supply pipes 48 to the manhold 56. The chains 50 are secured to the drive mechanism and the pipes 48 connected to external control means (not shown) in the vicinity of the manhole. With the leaf members 14 in the contracted configuration, the remotely controllable device is drawn along the duct so that the walls of the duct are forced into the surrounding soil wherever they intrude inside the diameter of the base member 10. Depending on the nature of the duct and the soil around it, the pulling force which can be exerted by the ram 52 and the chain 50 may be insufficient to draw the device past certain locations. This condition is sensed at the control location by monitoring movement of the chains 50 or the fluid pressure in the ram 52. To remove the obstruction, a significantly larger compression force can now be applied to the wall of the duct by operating the ram 12. By maintaining tension in the chains 50, the remotely controllable device will begin to move forward again when the leaf members 14 are retracted. Thus, by a continuation of pulling and expansion steps the device is drawn through the duct eventually to the manhole 56, leaving a passage of a diameter sufficient to accept a plastics lining of required diameter. Conveniently, the device may be used to draw pipe lining sections behind it as it progresses through the duct.

To allow fluids to continue to pass through the duct when the remotely controllable device is being used, the device may include a passage connecting the front end to the rear end. In this case, the ram 12 may be replaced by a plurality of rams spaced around the axis, leaving a clear axial passage through the device.

Figure 7:
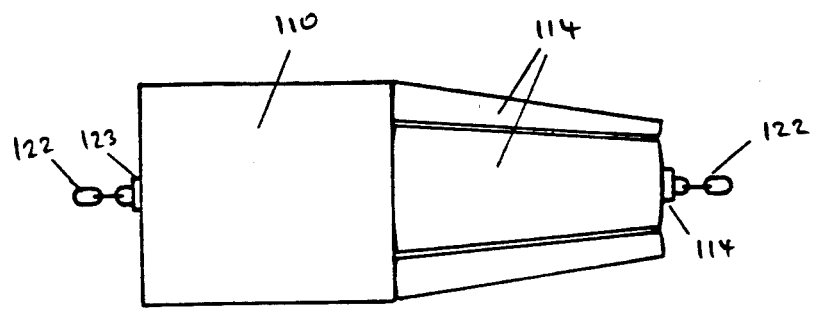
FIG. 7 is a schematic view of another preferred embodiment of the present invention showing the shell parts in the contracted configuration.
Figure 8:
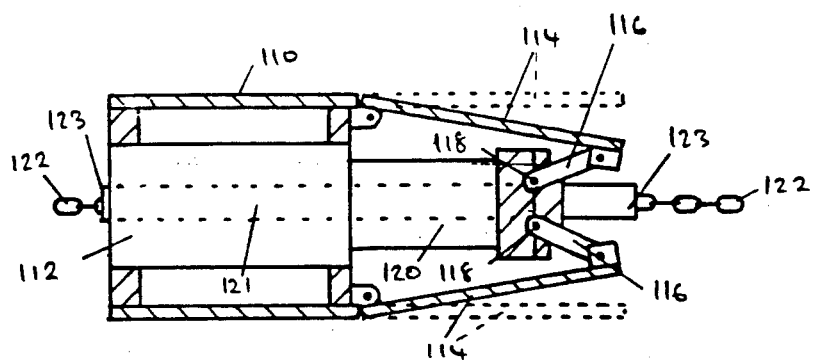
FIG. 8 is a cut away side view of FIG. 7 showing connecting links coupling the hydraulic ram with the distal end of shell parts.

A preferred embodiment of the invention is illustrated in FIGS. 7 and 8 of the drawings. The device comprises a body member 110 housing a hollow longitudinally mounted ram 112, and a leading portion comprising a plurality of leaf members 114 pivotally connected at their rear or proximal ends to the body member 110. In FIGS. 7 and 8 the leaf members 114 are shown in a contracted configuration. Each leaf member 114 is pivotally secured at its front or distal end to a connecting link 116 which is in turn secured to a respective pivot pin 118 fixed to the piston 120 of the ram 112. The position and length of the links 116, in particular their connection to the piston 120 at a point 'downstream' of the distal ends of the leaf members 114, are such that expansion of the ram 112 forces the leaf members 114 transversely outwardly away from the longitudinal axis of the device to push back the sides in which the device is operated. The ram 112, and its piston 120 are hollow, the cylinder having an annular section interior space between coaxial inner and outer walls. The piston 120 is also of annular section so that an axial passage 121 is available through the device for a chain or cable 122 running from a winch (as shown in FIG. 6) to a plate or the like fitted across the rear end of a lining pipe (not shown) travelling through the duct behind the device. The axial passage 121 is enclosed throughout the length of the device by a tube 123.

The device may incorporate electronic or mechanically actuated limit sensors (not shown) for sensing the fully expanded and contracted configurations of the piston 120, links 116, or leaf members 114 so that, if required, the expansion and contraction of the ram 112 can be carried out automatically. Thus, by reciprocating the ram 112 at a regular rate and applying a continuous tension to the chain 122, the device can be drawn through a duct with the minimum of supervision or manual control as previously explained with reference to FIGS. 1-6.

The use of pivotal links 116 avoids the sliding engagement of the leaf members with, for example, a wedge member as described above with reference to FIGS. 2-5. Such sliding engagement can lead to jamming or breakages if debris from the duct becomes lodged in the wedge mechanism. The pivotal link arrangement has the further advantage that the leverage exerated by the driving means increases as the leaf members move towards their expanded configuration; in other words, when the resistance offered by the wall of the duct is likely to be greatest, the ratio of piston movement is at its highest value.

Figure 9:
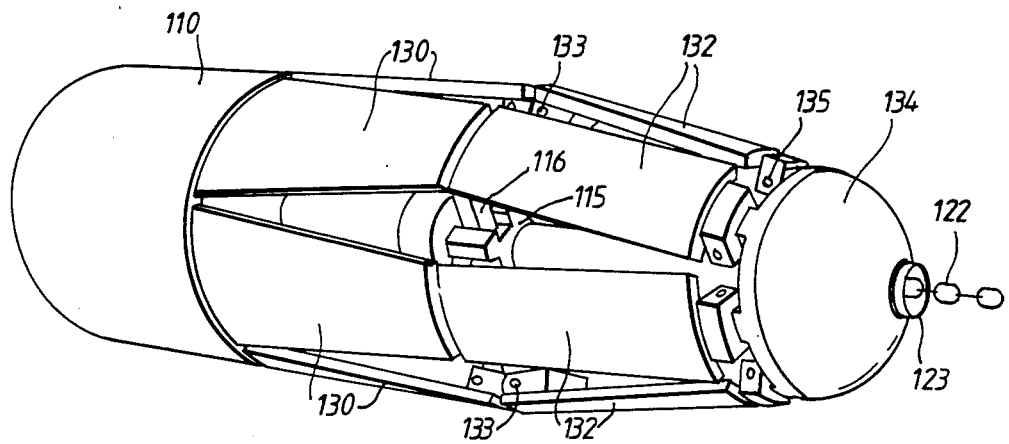
FIG. 9 is a perspective view of another embodiment of the present invention wherein the segmented front section of device comprises two sets of shell parts.
Figure 10A:
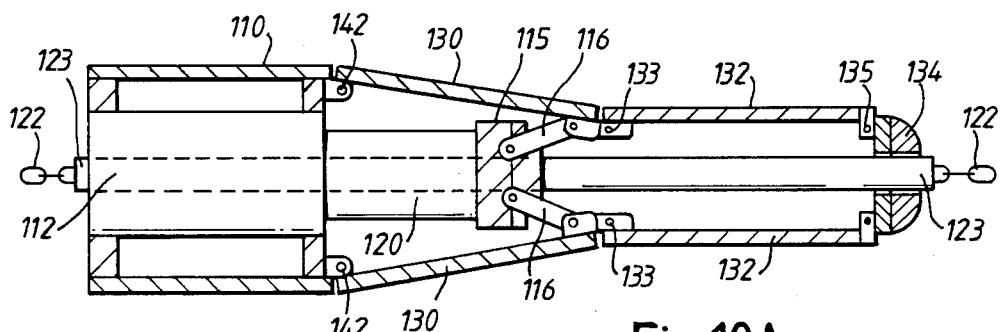
FIG. 10A is a cut away side view of the device of FIG. 9 showing shell parts in a retracted configuration.
Figure 10B:
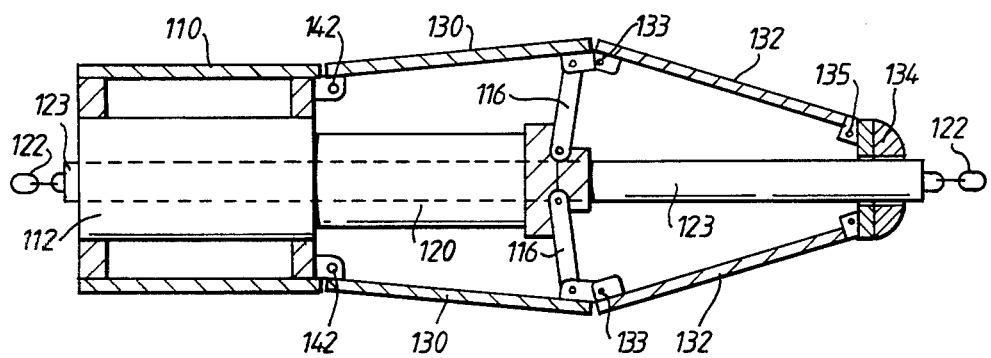
FIG. 10B is a view similar to FIG. 10A but showing shell parts in an expanded position.

A particularly preferred embodiment is shown in perspective in FIG. 9 and in section in FIGS. 10A and 10B. In this embodiment the front part of the device is an expandable shell having two sets of shell parts in the form of leaf members, these comprising (i) a first trailing set of leaf members 130 attached at their rear ends to a cylindrical rear body member 110 by a set of circumferential rear pivot joints 142, and (ii) a second, leading set of leaf members 132 each pivotally attached at their rear ends to the respective front ends of the trailing leaf members 130 by intermediate pivot joints 133, and at their front ends to a rounded front end pivot assembly 134 carrying a number of circumferential front pivot joints 135. Mounted in the body portion 110 is a longitudinal hydraulic ram 112 which in this example is annular, with an annular piston 120, providing a central longitudinal bore. This bore allows a central passage, defined by a tube 123, to be provided over the whole length of the device to receive a chain 122. The piston 120 carries a pivot block 115 which is, in turn, coupled by a plurality of radiating connecting links 116 to the intermediate pivot joints 133 for converting longitudinal motion of the piston 120 into lateral (with respect to the longitudinal axis of the device) motion of the front ends of the trailing leaf members 130 and the rear ends of the leading leaf members 132. The two sets of leaf members thus form an expandable shell having a leading portion constituting a nose portion for penetrating and expanding an unenlarged duct portion, and a trailing portion for subsequently further expanding that duct portion to an overall diameter such that the body portion can then move forwardly into the duct portion without further expansion of the duct sides.

In FIG. 9, the device is shown in its expanded configuration with the trailing set of leaf members 130 forming an approximately cylindrical envelope having a diameter at least as large as the diameter of the body member 110. The leading set of leaf members 132 form a generally conical surface which tapers forwardly from a diameter at least as large as that of the body member 110 to a smaller penetration diameter at the extreme forward end of the device. In the contracted configuration, the trailing leaf members 130 form a similar forwardly tapering conical surface whilst the leading leaf members 132 form a cylinder of the smaller penetration diameter. The fully contracted and expanded configurations are shown more clearly in FIGS. 10A and 10B respectively, which are sectional views.

The split front part of the device shown in FIGS. 9-11 has particular advantage in the enlargement of a duct. As illustrated in FIG. 11 where the device is shown in side elevation, the leading leaf members 132 in their contracted configuration are able to penetrate an original duct 140 of diameter $D_2$ which is larger than the penetration diameter referred to above but smaller than the diameter of the body member 110. The device is being used to enlarge the original duct 140 to a required diameter $D_2$ corresponding to the diameter of the body member 110, and at the same time, for drawing a pipe lining 144 of similar diameter through the duct behind it. With a continuous tension applied to the chain 122 (attached to the rear end of the lining 144 to place the joints between the sections of the lining under compression), the ram 112 (FIGS. 10A and 10B) is operated to expand the leaf members into the position shown by the dotted lines 142, forcing out the sides of the duct to the new diameter $D_2$. Since the leaf members are all of approximately equal length the forwardly tapered profile of the expanded duct formed by the expansion of the leading leaf members 132 corresponds to the forwardly tapered surface formed by the trailing leaf members 130 in their contracted configuration. Thus, when the ram 112 is caused to retract, the whole device and the pipe lining 144 can move forward by a distance "S" which is the length of the leaf members. This means that in a duct enlarging operation a full length "S" of the duct can be enlarged with each cycle of the ram 112. This is larger than the length that can be enlarged per cycle using the device of FIGS. 2-5 and 7-8, since the latter allows only a limited penetration distance into the original duct. In addition, the presence of the nose portion formed by the leading leaf members 132 reduces the possibility of the duct sides collapsing ahead of the device during the expansion operation, because the front ends of the leaf members 132 merely engage the duct sides to stablise them without expanding them at that point.

Another embodiment of the invention is shown in section in FIG. 12. In this embodiment a split expandable shell is employed as in FIGS. 9, 10A and 10B, but in this case a wedge expander 146 is coupled to the piston 120 instead of pivotable connecting links to expand the leaf members 130 and 132. This construction can be preferable when space is limited as in a device designed for relatively small ducts, typically 150 mm diameter or less.

In describing the invention, reference has been made to a preferred embodiment. Those skilled in the art, however, and familiar with the disclosure of the subject invention may recognise additions, deletions, substitutions, modifications and/or other changes which will fall within the perview of the invention as defined in the following claims.

What is claimed is:

1. Apparatus for travelling through an underground duct and for enlarging the duct or removing irregularities in the wall of the duct, wherein the apparatus comprises an elongate segmented shell arranged around a longitudinal axis of the apparatus and having outwardly facing surface portions for engaging the wall of the duct, and a trailing portion extending rearwardly of the shell in a longitudinal direction and having a diameter equal to or approaching the required duct diameter, wherein the shell is expandable laterally with respect to the axis from a contracted configuration in which at least a front end portion of the shell lies within a duct penetration diameter, to an expanded configuration for engaging the duct well over an area thereof and driving the said area of wall away for the axis to create a void within the duct for receiving the trailing portion when the apparatus travels forward in the duct.

2. Apparatus according to claim 1, wherein the apparatus includes internal fluid pressure drive means coupled to the segmented shell for expanding the shell.

3. Apparatus according to claim 2, wherein the drive means comprises a longitudinally acting hydraulic ram.

4. Apparatus for travelling through an underground duct and for enlarging the duct or removing irregularities in the wall of the duct, wherein the apparatus comprises an elongate segmented shell arranged around a longitudinal axis of the apparatus and having outwardly facing surface portions for engaging the wall of the duct, means for expanding the shell laterally with respect to the axis from a contracted configuration to an expanded configuration for forcing the wall of the duct away from the axis to enlarge a portion of the duct and for creating a void in the duct when the shell is returned to its contracted configuration, and wherein the shell further comprises a forwardly extending nose portion having an outer surface for engaging the wall of the duct ahead of the area to be driven away from the axis.

5. Apparatus according to claim 4, including internal fluid pressure drive means coupled to the segmented shell for expanding the shell.

6. Apparatus according to claim 5, wherein the shell defines, in the expanded configuration, an outer surface having a forwardly tapered front surface portion and a cylindrical or rearwardly tapered rear surface portion.

7. Apparatus for travelling through an underground duct and for enlarging the duct or removing irregularities in the wall of the duct, wherein the apparatus comprises an expandable segmented shell arranged around a longitudinal axis of the apparatus and having an outwardly facing surface portion for engaging the wall of the duct over a transversely and longitudinally extending area, and drive means coupled to the shell for driving said surface portion radially away from the axis thereby to move said duct wall area outwardly into the surrounding material, and wherein, in the contracted configuration of the shell, at least part of said surface portion lies within a duct penetration diameter, and in the expanded configuration of the shell, the surface portion forms part of a forwardly tapering cone.

8. Apparatus according to claim 7, wherein the shell defines, in the expanded configuration, an outer surface having a forwardly tapered front surface portion and a cylindrical or rearwardly tapered rear surface portion.

9. Apparatus according to claim 8 having, in the contracted configuration of the shell, a forwardly tapered rear outer surface portion corresponding substantially in shape to said forwardly tapered front surface portion of the expanded shell.

10. A method of removing irregularities in or enlarging an underground duct comprising:
(i) locating in the duct an expansion device including a leading expandable shell portion and a trailing expandable shell portion, which portions comprise respectively leading and trailing sets of shell parts which are movable laterally with respect to a longitudinal axis between a contracted configuration and an expanded configuration, the device being located in the duct with the shell parts in their contracted configuration and the leading shell portion in an unexpanded duct portion;
(ii) driving the shell parts into their expanded configuration to force the sides of the duct away from the axis to create an enlarged duct portion having a front section which is forwardly tapering and a rear section having an overall diameter at least as large as the required diameter of the duct;
(iii) causing the shell parts to return to their contracted configuration and the device to move forwardly by a distance such that leading shell portion enters a new unexpanded duct portion, and the trailing shell portion substantially occupies the said front section of the enlarged duct portion; and
(iv) repeating steps (ii) and (iii) to traverse a required duct length.

11. A method according to claim 10, wherein a continuous forwardly directed force is applied to the device over a plurality of cycles of steps (ii) and (iii).

12. A method of lining an underground duct, including enlarging the duct as defined in claim 10, and simutaneously feeding a lining pipe into the duct.

13. A device for removing irregularities in or enlarging an underground duct comprising an expandable segmented shell having two sets of shell parts arranged around a longitudinal axis of the device, the two sets comprising a front set in which the shell parts are each pivotally attached by front end portions thereof to a forward pivot assembly, and a rear set in which the shell parts are each pivotally attached by front end portions thereof to rear end portions of respective shell parts of the front set, and by rear end portions thereof to a base member.

14. A method of removing irregularities in or enlarging an underground duct including:
(i) locating in the duct apparatus according to any of claims 1, 4 and 7 with the shell in its contracted configuration;
(ii) driving the shell radially outward to its expanded configuration to create an expanded duct portion;
(iii) returning the shell to its contracted configuration;
(iv) causing the apparatus to move forwardly into the expanded duct portion; and
(v) repeating steps (ii), (iii), and (iv) to traverse a required length of the duct.

15. A method according to claim 14, wherein the expanded duct portion is forwardly tapered over at least a part of its length.

16. A method of enlarging or removing irregularities in an underground duct comprising:
(i) locating in the duct apparatus having a front part including an expandable shell portion comprising a plurality of shell parts arranged around a longitudinal axis, and movable laterally with respect to the axis between a contracted configuration in which at least a front end section of the expandable shell portion lies within a duct penetration diameter and an expanded configuration defining a larger, required duct diameter, and a rear part having a diameter greater than the penetration diameter and less than or equal to the required duct diameter, the apparatus being located in the duct with the shell parts in their contracted configuration and penetrating a portion of the duct of less than the required diameter;
(ii) driving the shell parts outwardly into their expanded configuration thereby forcing the sides of the duct away from the axis to create an enlarged duct portion having a diameter at least as great as the said required duct diameter;
(iii) causing the shell parts to return to their contracted configuration and the apparatus to move forwardly in the duct whereby the shell parts penetrate a new portion of the duct of less than the required diameter;

(iv) repeating steps (ii) and (iii) to traverse a required duct length; and in which a continuous forwardly directed force is applied to the apparatus over a plurality of cycles of steps (ii) and (iii).

17. A method according to claim 16, wherein the rear part of the apparatus comprises a lining pipe.

18. A method according to claim 16, wherein the enlarged duct portion is forwardly tapered.

19. Apparatus for travelling through an underground duct and for enlarging the duct, wherein the apparatus comprises an elongate segmented shell having a central longitudinal axis and including a shell portion which is movable radially outwardly away from the axis toward the duct wall, drive means coupled to the shell portion to drive the shell portion radially outwardly from a contracted state in which the shell portion lies within a duct penetration diameter to an expanded state thereby to engage a portion of the duct wall over a circumferentially and longitudinally extending area and to drive said duct wall portion radially away from the axis to create a space into which a rear portion of the apparatus may move when moved forward in the duct.

20. Apparatus according to claim 19 wherein the movable shell portion is generally part conical in shape.

21. Apparatus according to claim 19 wherein the drive means comprises a longitudinally and internally mounted ram, and wherein the apparatus further includes means connecting the ram to the shell portion for converting a longitudinal movement of the ram to movement radially of the axis.

22. Apparatus according to claim 21 wherein the connecting means comprises a wedge expander.

23. Apparatus according to claim 19 wherein the shell portion includes hinge means at a forward end thereof.

24. Apparatus for travelling through an underground duct and for enlarging the duct, wherein the apparatus comprises an elongate segmented shell of generally circular cross section having a central longitudinal axis and including a shell portion which is movable radially outwardly away from the axis and which has a circumferentially and longitudinally extending surface portion for engaging a surface area of the duct wall, and an internal fluid-driven ram means coupled to the shell portion for driving the shell portion radially outwardly from a retracted state to force said duct wall portion radially outwardly into material around the duct, the shell portion being arranged such that, in its retracted state, at least a forward end of said surface portion lies within a duct penetration diameter and, in its extended state, the surface portion in a longitudinal cross-section is inclined towards the axis in the direction of travel, whereby movement of the shell portion from its retracted state to its expanded state and back to its retracted state creates a void to allow forward movement of the apparatus in the duct.

* * * * *

REEXAMINATION CERTIFICATE (2149th)
United States Patent [19]

Yarnell

[11] B1 4,789,268

[45] Certificate Issued  Dec. 14, 1993

[54] DEVICE AND METHOD FOR REMOVING IRREGULARITIES IN OR ENLARGING AN UNDERGROUND DUCT

[75] Inventor: Ian R. Yarnell, Haslemere, England

[73] Assignee: Miller Pipeline Corporation, Indianapolis, Ind.

Reexamination Request:
No. 90/002,877, Nov. 2, 1992

Reexamination Certificate for:
Patent No.: 4,789,268
Issued: Dec. 6, 1988
Appl. No.: 22,708
Filed: Mar. 6, 1987

Certificate of Correction issued Apr. 19, 1989.

Related U.S. Application Data

[63] Continuation of Ser. No. 679,671, Dec. 10, 1984, Pat. No. 4,657,436, which is a continuation-in-part of Ser. No. 504,603, Jun. 15, 1983, Pat. No. 4,487,052.

[30] Foreign Application Priority Data

Jun. 18, 1981 [GB] United Kingdom ............... 8217645
Dec. 16, 1983 [GB] United Kingdom ............... 8333567

[51] Int. Cl.$^5$ ................................................ F16L 1/00
[52] U.S. Cl. ................................... 405/154; 30/92.5; 166/55.3; 166/361; 405/184
[58] Field of Search ........................................... 405/154

[56] References Cited

U.S. PATENT DOCUMENTS

| | | |
|---|---|---|
| Re. 21,824 | 6/1941 | Lowrey . |
| 652,367 | 6/1900 | Law . |
| 928,361 | 7/1909 | Cockburn . |
| 1,001,205 | 8/1911 | Lovell . |
| 1,417,331 | 5/1922 | Keller . |
| 1,494,128 | 5/1924 | Primrose . |
| 1,618,368 | 2/1927 | Dietle . |
| 1,638,494 | 8/1927 | Lewis et al. . |
| 2,088,785 | 8/1937 | Gifford . |
| 2,481,637 | 9/1949 | Yancey . |
| 2,638,165 | 5/1953 | Barber . |
| 2,753,935 | 7/1956 | Fredd . |
| 2,906,226 | 9/1959 | Myrick et al. . |
| 2,934,147 | 4/1960 | Baker . |
| 2,947,253 | 8/1960 | Cirilo . |
| 2,983,042 | 5/1961 | Frantz . |
| 3,005,493 | 10/1961 | Crowe et al. . |
| 3,067,801 | 12/1962 | Sortor . |
| 3,073,389 | 1/1963 | Conner . |
| 3,193,012 | 7/1965 | Huitt et al. . |
| 3,211,221 | 10/1965 | Huitt . |
| 3,730,283 | 5/1973 | Kostylev et al. . |
| 3,749,365 | 7/1973 | Van Gompel . |
| 3,817,079 | 6/1974 | Priester . |
| 3,920,070 | 11/1975 | Goins . |
| 3,937,054 | 2/1976 | Hortvet et al. . |
| 4,003,433 | 1/1977 | Goins . |
| 4,100,980 | 7/1978 | Jenne . |
| 4,165,784 | 8/1979 | Gardner . |
| 4,299,347 | 11/1981 | Rougier . |
| 4,471,838 | 9/1984 | Bodine . |
| 4,475,373 | 10/1984 | Ikenberry . |
| B1 4,507,019 | 12/1987 | Thompson . |
| 4,634,313 | 1/1987 | Robbins . |
| 4,640,354 | 2/1987 | Boisson . |

FOREIGN PATENT DOCUMENTS

| | | |
|---|---|---|
| 585684 | 10/1959 | Canada . |
| 1261952 | 2/1972 | United Kingdom . |
| 1406769 | 9/1975 | United Kingdom . |
| 1503689 | 3/1978 | United Kingdom . |

*Primary Examiner*—Dennis L. Taylor
*Attorney, Agent, or Firm*—Barnes & Thornburg

[57] ABSTRACT

A device for removing irregularities in or enlarging a buried duct comprises a cylindrical housing corresponding approximately in diameter to the required diameter of the duct, an expandable shell comprising a plurality of tapered leaf members pivotally attached at their rear ends to the front of the housing, and remotely controllable drive means for moving the leaf members between contracted and expanded configurations. In operation, the apparatus is drawn through the duct with the leaf members in a contracted configuration in which they enter a portion of the duct of a diameter less than the required diameter. The drive means is operated to force the leaf members outwardly against the sides of the duct to expand the duct. The leaf members are then retracted and the apparatus is drawn forward. The apparatus is particularly intended for preparing damaged sewers prior to fitting an inner, lining pipe.

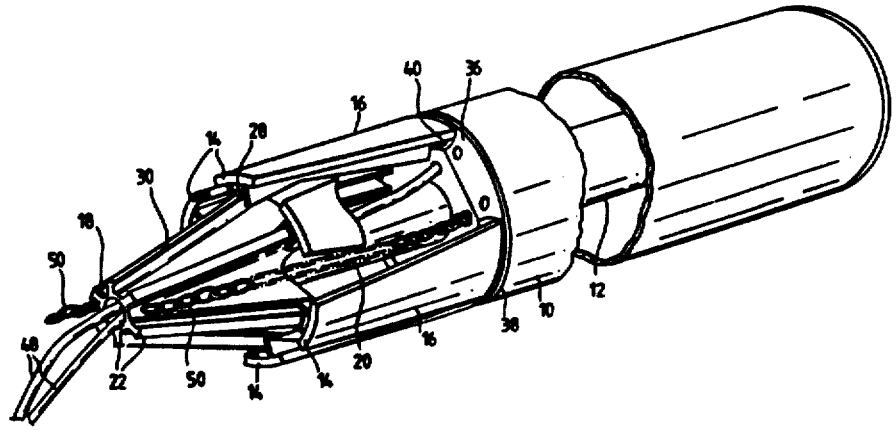

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10-24 is confirmed.

Claims 1, 4 and 7 are determined to be patentable as amended.

Claims 2, 3, 5, 6, 8 and 9, dependent on an amended claim, are determined to be patentable.

1. Apparatus for travelling through an underground duct and for enlarging [the] *said* duct or removing irregularities in the wall of [the] *said* duct, wherein the apparatus comprises an elongate segmented shell arranged around a longitudinal axis of the apparatus and having outwardly facing surface portions for engaging [the] *said* wall of [the] *said* duct, and a trailing portion extending rearwardly of [the] *said* shell in a longitudinal direction and having a diameter equal to or approaching the required duct diameter, said trailing portion including means for *cooperating with said shell and conduit such that said shell and said trailing portion draws said conduit through said duct as said shell and said trailing portion travel through said duct,* wherein [the] *said* shell is expandable laterally with respect to [the] *said* longitudinal axis from a contracted configuration in which at least a front end portion of [the] *said* shell lies within a duct penetration diameter, to an expanded configuration for engaging [the] *said* duct [well] *wall* over an area thereof and driving [the] said area of wall away [for the] *from said longitudinal* axis to create a void within [the] *said* duct for *initially* receiving [the] *said* trailing portion [when] *and said conduit with the cooperating means as* the apparatus travels forward in [the] *said* duct *so that said conduit drawn by the shell and trailing portion through the duct is fitted inside the void created by repeated expansion of the forwardly moving shell.*

4. Apparatus for traveling *forwardly* through an underground duct and for enlarging [the] *said* duct or removing irregularities in the wall of [the] *said* duct, wherein the apparatus comprises an elongate segmented shell arranged around a longitudinal axis of the apparatus and having outwardly facing surface portions for engaging [the] *said* wall of [the] *said* duct, means for expanding [the] *said* shell laterally with respect to [the] *said longitudinal* axis from a contracted configuration to an expanded configuration for forcing [the] *said* wall of [the] *said* duct away from [the] *said longitudinal* axis *and into the surrounding underground material* to enlarge a portion of [the] *said* duct and for creating a void in [the] *said* duct when [the] said shell is returned to its contracted configuration, *and a rearward portion comprising means for pulling a conduit forwardly into said void as said shell travels forwardly through said duct,* and wherein [the] *said* shell further comprises a forwardly extending, *tapered* nose portion having an outer surface for engaging [the] *said* wall of [the] *said* duct ahead of [the] *said* area to be driven away from [the] *said longitudinal* axis.

7. Apparatus for traveling *forwardly* through an underground duct and for enlarging [the] *said* duct [or removing irregularities in the wall of the duct], wherein the apparatus comprises an expandable segmented shell arranged around a longitudinal axis of the apparatus and having an outwardly facing surface portion for engaging the wall of [the] *said* duct over a transversely and longitudinally extending area, *means for engaging a conduit so as to enable the apparatus to pull said conduit through said duct after enlarging of said duct,* and drive means coupled to [the] *said* shell for driving said surface portion radially away from [the] *said longitudinal* axis thereby to move said duct wall area outwardly into the surrounding *underground* material, and wherein, in the contracted configuration of [the] *said* shell, at least part of said surface portion lies within a duct penetration diameter, and in the expanded configuration of [the] said shell, [the] *said* surface portion forms part of a forwardly tapering cone.

* * * * *

REEXAMINATION CERTIFICATE (2755th)
United States Patent [19]
Yarnell

[11] B2 4,789,268
[45] Certificate Issued  Dec. 26, 1995

[54] DEVICE AND METHOD FOR REMOVING IRREGULARITIES IN OR ENLARGING AN UNDERGROUND DUCT

[75] Inventor: Ian R. Yarnell, Haslemere, England

[73] Assignee: Miller Pipeline Corporation, Indianapolis, Ind.

Reexamination Request:
No. 90/003,841, May 24, 1995

Reexamination Certificate for:
Patent No.: 4,789,268
Issued: Dec. 6, 1988
Appl. No.: 022,708
Filed: Mar. 6, 1987

Reexamination Certificate B1 4,789,268 issued Dec. 14, 1993

Certificate of Correction issued Apr. 19, 1989.

Related U.S. Application Data

[63] Continuation of Ser. No. 679,671, Dec. 10, 1984, Pat. No. 4,657,436, which is a continuation-in-part of Ser. No. 504,603, Jun. 15, 1983, Pat. No. 4,487,052.

[51] Int. Cl.$^6$ .............................. F16L 1/00; F16L 55/18
[52] U.S. Cl. ..................... 405/154; 30/92.5; 166/55.3; 166/361; 405/184

[56] References Cited

U.S. PATENT DOCUMENTS 1,769,350  7/1930  Langstaff .
1,880,218  10/1932  Simmons .
2,780,122  2/1957  McCown .
4,487,052  12/1984  Yarnell .
4,657,436  4/1987  Yarnell .
4,738,565  4/1988  Streatfield .

FOREIGN PATENT DOCUMENTS 1207906  12/1965  Germany .

OTHER PUBLICATIONS

"American Machinist" magazine, Oct. 16, 1950 issue, p. 169.

*Primary Examiner*—Dennis L. Taylor

[57] ABSTRACT

A device for removing irregularities in or enlarging a buried duct comprises a cylindrical housing corresponding approximately in diameter to the required diameter of the duct, an expandable shell comprising a plurality of tapered leaf members pivotally attached at their rear ends to the front of the housing, and remotely controllable drive means for moving the leaf members between contracted and expanded configurations. In operation, the apparatus is drawn through the duct with the leaf members in a contracted configuration in which they enter a portion of the duct of a diameter less than the required diameter. The drive means is operated to force the leaf members outwardly against the sides of the duct to expand the duct. The leaf members are then retracted and the apparatus is drawn forward. The apparatus is particularly intended for preparing damaged sewers prior to fitting an inner, lining pipe.

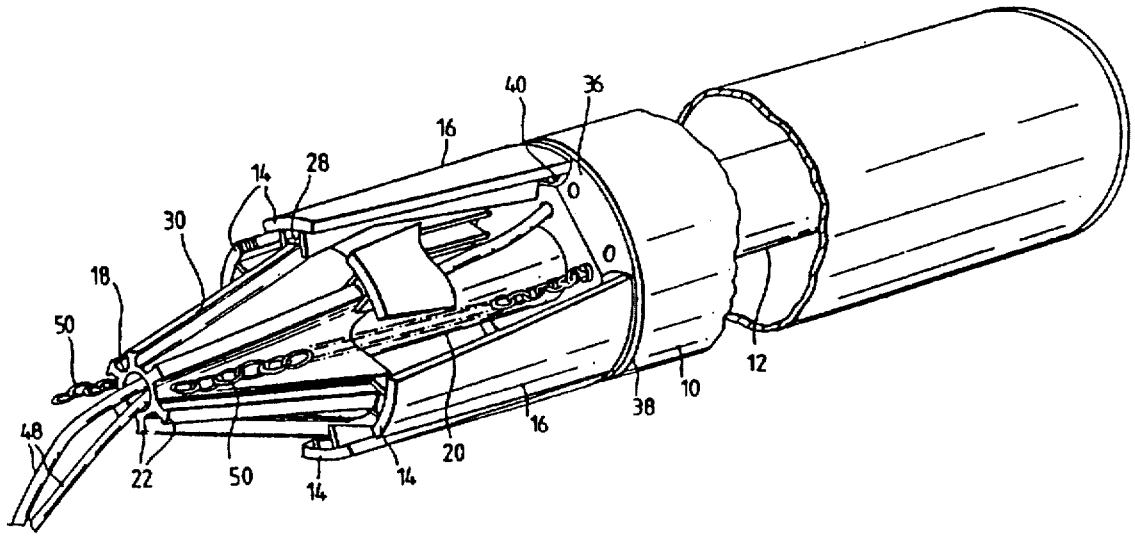

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 and 16–24 is confirmed.

Claim 14 is determined to be patentable as amended.

Claim 15, dependent on an amended claim, is determined to be patentable.

14. A method of removing irregularities in or enlarging an underground duct including:
 (i) locating in the duct apparatus according to any of claims 1, 4 [and] *or* 7 with the shell in its contracted configuration;
 (ii) driving the shell radially outward to its expanded configuration to create an expanded duct portion;
 (iii) returning the shell to its contracted configuration;
 (iv) causing the apparatus to move forwardly into the expanded duct portion; and
 (v) repeating steps (ii), (iii), and (iv) to traverse a required length of the duct.

* * * * *